United States Patent [19]
Mamyshev et al.

[11] Patent Number: 5,463,489
[45] Date of Patent: Oct. 31, 1995

[54] SOLITON TRANSMISSION SYSTEM HAVING SLIDING-FREQUENCY GUIDING FILTERS WITH PARTICULAR FILTER STRENGTHS AND SLIDING RATES

[75] Inventors: Pavel V. Mamyshev, Middletown; Linn F. Mollenauer, Colts Neck, both of N.J.

[73] Assignee: AT&T Corp., Murray Hill, N.J.

[21] Appl. No.: 297,336

[22] Filed: Aug. 29, 1994

Related U.S. Application Data

[63] Continuation-in-part of Ser. No. 904,239, Jun. 25, 1992, Pat. No. 5,357,364.

[51] Int. Cl.$^6$ ................................................. H04B 10/12
[52] U.S. Cl. ............................ 359/173; 359/127; 359/179
[58] Field of Search ..................................... 359/127, 173, 359/179, 188, 195

[56] References Cited

U.S. PATENT DOCUMENTS

| | | |
|---|---|---|
| 4,406,516 | 9/1983 | Hasegawa . |
| 4,635,263 | 1/1987 | Mollenauer . |
| 4,700,339 | 10/1987 | Gordon et al. . |
| 4,830,451 | 5/1989 | Stone . |
| 4,861,136 | 8/1989 | Stone et al. . |
| 5,035,481 | 7/1991 | Mollenauer . |
| 5,037,180 | 8/1991 | Stone . |
| 5,050,954 | 9/1991 | Gardner et al. . |
| 5,117,303 | 5/1992 | Desurvire et al. . |
| 5,140,656 | 8/1992 | Hasegawa et al. . |

OTHER PUBLICATIONS

Dianov, E. M., et al., "Long-Range Interaction of Solitons in Ultra-Long Communication Systems," Sov. Lightwave Commun., vol. 1, pp. 235–246, 1991.

Gordon, J. P., Mollenauer, L. F., "Effects of Fiber Nonlinearities and Amplifier Spacing on Ultra-Long Distance Transmission," Journal of Lightwave Technology, vol. 9, No. 2, pp. 170–173, Feb. 1991.

Gordon, J. P., Haus, H. A., "Random Walk of Coherently Amplified Solitons in Optical Fiber Transmission," Optics Letters, vol. 11, No. 10, pp. 665–667, Oct. 1986.

Kobrinski, H., Cheung, K.-W., "Wavelength-Tunable Optical Filters: Applications and Technologies," IEEE Communications Magazine, pp. 53–63, Oct. 1989.

Kodama, Y., Wabnitz, S., "Analysis of Soliton Stability and Interactions with Sliding Filters," Optics Letters, vol. 19, No. 3, pp. 162–164, Feb. 1, 1994.

Kodama, Y., Hasegawa, A., "Generation of Asymptotically Stable Optical Solitons and Suppression of the Gordon–Haus Effect." Optics Letters, vol. 17, No. 1, pp. 31–33, Jan. 1, 1992.

Mecozzi, A., et al., "Soliton Transmission Control," Optic Letters, vol. 16, No. 23, pp. 1841–1843, Dec. 1, 1991.

Miller, S. E., et al., "Optical Fiber Telecommunications II," Academic Press, pp. 90–99, 1988.

Mollenauer, L. F., et al., "Demonstration of Error–Free Soliton Transmission Over More Than 15000 km at 5 Gbit/s, Single–Channel, and Over More Than 11000 km at 10 Gbit/s in Two–Channel WDM," Electronics Letters, vol. 28, No. 8, pp. 792–794, Apr. 9, 1992.

Mollenauer, L. F., et al., "Demonstration, Using Sliding–Frequency Guiding Filters, of Error–Free Soliton Transmission Over More Than 20 Mm at 10 Gbit/s, Single Channel, and Over More Than 13 MM at 20 Gbit/s in a Two–Channel WDM," Electronics Letters, vol. 29, No. 10, pp. 910–911, May 13, 1993.

(List continued on next page.)

Primary Examiner—Leslie Pascal

[57] ABSTRACT

A soliton transmission system comprising optical filters whose center frequency intentionally differs from the center frequency of adjacent optical filters is disclosed, wherein the filter strength $\eta$ of the filters is between about 0.3–0.5, and preferably is 0.4. The center frequency of the series of optical filters is translated along the desired length of the system in a predetermined manner at a rate of less than or equal to $(2/27)^{1/2}\eta$ and greater than or equal to $0.034\eta + 0.047\eta^2$. The center frequencies of the optical filters preferably increase in the direction of propagation.

18 Claims, 6 Drawing Sheets

OTHER PUBLICATIONS

Mollenauer, L. F., et al., "Measurement of Timing Jitter in Filter–Guided Soliton Transmission at 10 Gbits/s and Achievement of 375 Gbits/s–Mm, Error Free, at 12.5 and 15 Gbits/s," Optics Letters, vol. 19, No. 10, pp. 704–706, May 15, 1994.

Mollenauer, L. F., "Soliton Transmission Speeds Greatly Multiplied by Sliding–Frequency Guiding Filters," Optics & Photonics News, pp. 15–19, Apr. 1994.

Mollenauer, L. F., et al., "The Sliding–Frequency Guiding Filter: An Improved Form of Soliton Jitter Control," Optics Letters, vol. 17, No. 22, pp. 1575–1577, Nov. 15, 1992.

Nakazawa, M. et al., "10 Gbit/s Soliton Transmission Over One Million Kilometres," Electronics Letters, vol. 27, No. 14, pp. 1270–1272, Jul. 4, 1991.

SOLITON TRANSMISSION SYSTEM HAVING SLIDING-FREQUENCY GUIDING FILTERS WITH PARTICULAR FILTER STRENGTHS AND SLIDING RATES

The present application is a continuation-in-part of U.S. Ser. No. 07/904,239, filed on Jun. 25, 1992, which issued on Oct. 18, 1994 bearing U.S. Pat. No. 5,357,364.

FIELD OF THE INVENTION

This invention relates to soliton transmission systems wherein optical filters are positioned at specific locations along the transmission medium of the lightwave system, and more particularly, a soliton transmission system with sliding frequency filters of particular filter strengths and sliding rates.

BACKGROUND OF THE INVENTION

Soliton transmission systems can potentially provide exceedingly high information transmission capacity over long distances. In ultra-long distance systems such as transcontinental and transoceanic systems, optical amplifiers periodically boost the power of propagating information-bearing soliton pulses to compensate for losses experienced in the fiber transmission medium. Unfortunately for ultra-long distance systems, however, the maximum information bit rate for a single channel is set by the amount of jitter in pulse arrival times generated by two different effects. One is the Gordon-Haus effect and the other is an acoustic interaction effect.

The Gordon-Haus effect is caused by the interaction of soliton pulses with amplifier spontaneous emission noise present along the transmission medium. J. P. Gordon et al. describe this effect in Optic Letters, Vol. 11, No. 10, pp. 665–7 (1986). Amplifier spontaneous emission noise randomly alters both the amplitude and carrier or channel frequency of the soliton pulses, resulting in a jitter in pulse arrival times. Pulse jitter can cause a soliton pulse to shift into the time interval reserved for a neighboring soliton pulse. The result, often known as intersymbol interference, is an error in the received information.

The acoustic interaction effect results from electrostriction caused by the electromagnetic field of the soliton pulse. Such electrostriction creates an acoustic wave which crosses the fiber core, changing the index of refraction of the region of the optical fiber proximate the pulse. After the pulse passes, the index of refraction of that region of the optical fiber returns to its normal state. If the soliton pulses are being transmitted at a sufficiently high rate (1 Gbit/sec or greater), a subsequent soliton pulse may arrive in that region before the effect of the prior pulse has dissipated. This can cause a shift in the frequency peak of that soliton pulse.

It has been found that the Gordon-Haus effect and the acoustic interaction effect can be reduced by the use of filters whose nominal filter center frequencies are different from the center frequencies of adjacent filters. The center frequency of each successive optical filter can be translated up or down in a predetermined pattern such as frequency increasing, frequency decreasing, or a combination of both. Use of such filters, referred to as "sliding frequency guiding filters" by their inventors and described in U.S. Pat. No. 5,357,364, incorporated by reference herein, creates a transmission environment which is substantially opaque to noise while remaining perfectly transparent to solitons. In this transmission system, soliton pulses are launched at a particular frequency and, as they propagate along the transmission medium, are accelerated toward successively different frequencies determined by the optical filter center frequency for each of the sliding-frequency guiding filters. A nonlinear interaction of the soliton pulse with the optical fiber causes each soliton pulse to generate new frequency components to match the frequency of each filter, causing each soliton pulse to emerge at a substantially different frequency from the launch frequency. The frequency shift overcomes deviations caused by the Gordon-Haus and acoustic interaction effects.

Since the generation of new frequency components by the soliton pulse is the result of a nonlinear effect, linear pulses, such as noise, cannot generate the new frequencies required to follow the changing frequencies of the sliding filters. Such pulses, therefore, eventually suffer catastrophic energy loss from the action of the sliding filters as they are left behind in a different frequency band. Stronger filter response characteristics are therefore possible, enabling greater jitter reduction than prior art systems without incurring the usual penalty of exponentially rising noise from the excess amplifier gain required to overcome the additional filter loss. The reduction of the Gordon-Haus and acoustic interaction effects dramatically improves transmission of solitons over transoceanic distances.

In a given optical transmission system supporting soliton propagation, there is a maximum and minimum soliton pulse energy which can be effectively propagated. Soliton pulses with energies above the maximum can generate additional soliton pulses. Soliton pulses with energies below the minimum will dissipate. In both cases, errors will be introduced into the transmission. Optical transmission systems preferably provide a reasonable tolerance for transmission energies.

SUMMARY OF THE INVENTION

It has been found that filter parameters such as filter strength and the mean rate of change of sliding filter frequency, can affect the ratio of maximum to minimum soliton energy which can be effectively propagated.

In accordance with the present invention, therefore, a lightwave transmission system supporting soliton propagation in a particular band of frequencies is disclosed comprising an optical fiber transmission medium comprising a plurality of optical amplifiers spaced apart along the optical fiber transmission medium and a plurality of optical fibers spaced apart along the optical fiber transmission medium. Each optical filter exhibits a nominal center frequency substantially different from the nominal center frequency of each other optical filter to move the frequency of the soliton toward its nominal center frequency, each nominal center frequency being in the particular band of frequency. The optical filters may have a filter strength $\eta$ in soliton units of between about 0.3–0.5, with a value of 0.4 being preferred.

The center frequencies of the plurality of optical filters is preferably changed at a mean rate in soliton units of less than or equal to approximately $(2/27)^{1/2}\eta$ and greater than or equal to approximately $0.034\eta + 0.047\eta^2$. The frequencies of the optical filters also preferably increase in the direction of soliton propagation.

In another embodiment of the invention, a method for soliton propagation in a lightwave transmission system is disclosed comprising amplifying solitons at a plurality of locations along the system; and filtering the solitons at a plurality of locations along the system to translate the solitons to a second frequency different from a soliton launch frequency by filters having a filter strength $\eta$ of about 0.3–0.5, and preferably about 0.4. The mean rate of change of frequency in soliton units is preferably less than $(2/27)^{1/2}\eta$ and greater than about $0.034\eta+0.047\eta^2$.

The features discussed above, as well as additional features and advantages of the present invention, will become more readily apparent by reference to the following detailed description and accompanying drawings.

BRIEF DESCRIPTION OF THE DRAWINGS

A more complete understanding of the invention may be obtained by reading the following description of specific illustrative embodiments of the invention in conjunction with the appended drawings in which.

DETAILED DESCRIPTION OF THE INVENTION

Figure 1:
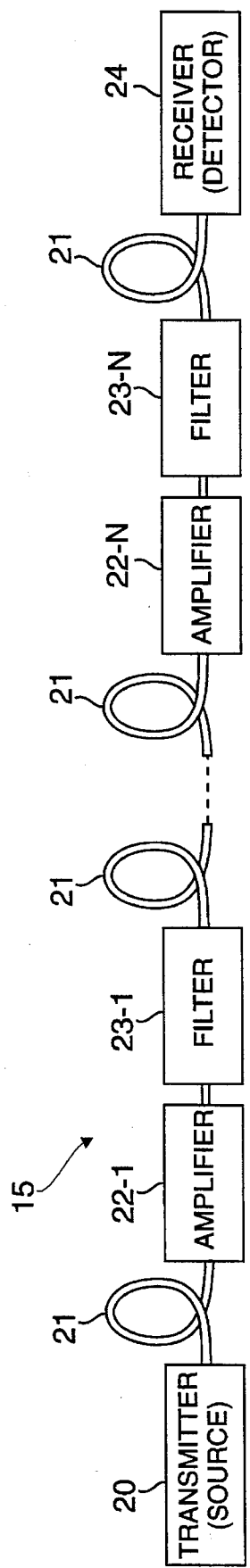
FIG. 1 is an exemplary light wave transmission system supporting soliton propagation, in accordance with the present invention.

FIG. 1 is a schematic representation of a soliton transmission system 15 incorporating the teachings of the present invention. The basic system is discussed in detail in U.S. Ser. No. 07/904,239, assigned to the assignee of the present invention and incorporated by reference herein. That system will be briefly described herein, prior to discussing the details of the present invention.

An optical fiber transmission system 15 as shown in FIG. 1 typically includes a transmitter 20, a receiver 24 and a transmission medium, such as lengths of optical fiber 21. Pairs of connected optical amplifiers and filters, such as amplifier 22-1 and filter 23-1, are preferably disposed at predetermined intervals along the transmission medium. The plurality of optical amplifiers and filters are indicated by elements 22-1–22-N, and 23-1–23-N, respectively, in FIG. 1. The optical amplifiers 22-I–22-N may suitably comprise an optically pumped section of rare earth doped optical fiber, such as erbium doped optical fiber, to provide gain to pulses propagating at the soliton center frequency. The filters 23-1–23-N are sliding frequency filters whose nominal center frequencies differ from each other, as described in U.S. Ser. No. 07/904,239, incorporated by references herein. The frequencies of the filters 23-1–23-N can increase, decrease or both. It is preferred that the frequencies of the filters 23-1–23-N increase in the direction of transmission. Other details of the filters 23-1–23-N in accordance with the present invention are discussed below.

While providing pairs of amplifiers and filters is preferred, several amplifiers can be provided in series followed by a single filter. The filters 23-1–23-N are preferably spaced along the lengths of optical fibers 21, about 30–50 km apart. Larger spacings can be provided, but the spacing is preferably less than the soliton unit length $z_c$ for the transmitted soliton pulses, as defined below. The amplifier spacings can be similar.

Soliton pulses of optical radiation are generated at a nominal soliton center frequency $\Omega$ by the transmitter 20. The pulses are then coupled in the transmission medium where the frequencies of the pulses are translated by the sliding frequency filters 23-1–23-N. After transmission through the medium, the pulses are detected at the receiver 24. Unidirectional transmission is depicted in order to simplify the explanation of the principles of the present invention without limiting the scope of the invention. Isolators (not shown) can be provided between any of the amplifiers 22-1–22-N and filters 23-1–23-N in unidirectional systems, as is known in the art. While the present invention is described in terms of a single channel or single frequency soliton system, the teachings of the present invention are extendible to frequency-division-multiplexed systems utilizing a plurality of different soliton frequency channels, as well.

Figure 2:
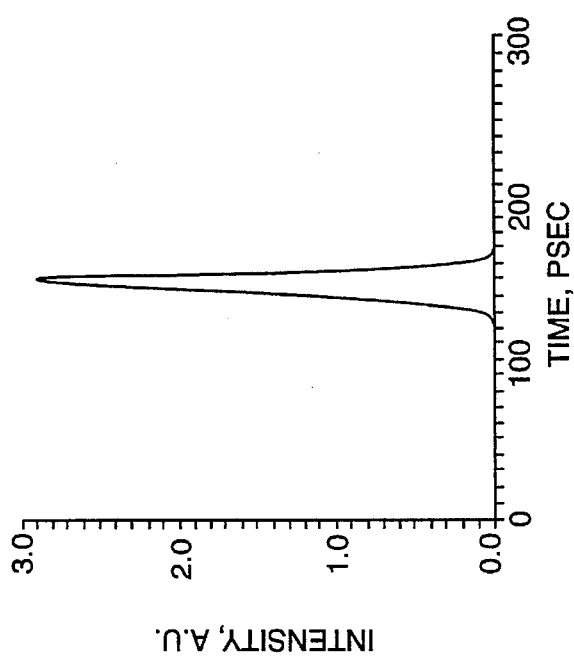
FIG. 2 is an exemplary soliton pulse.

Creation of soliton pulses is dependent upon proper launch and transmission characteristics such as pulse power, pulse width, center frequency, fiber dispersion and the like. These characteristics are well known to those skilled in the art and will not be discussed further herein. For additional background information concerning soliton generation and soliton transmission, see *Optical Fiber Telecommunications II.*, ed. S. E. Miller et al., pp. 90 et seq. (Academic Press 1988) and see also U.S. Pat. No. 4,406,516. FIG. 2 is an illustration of a soliton pulse, which has the form $\text{sech}^2(t)$.

Returning to FIG. 1, the transmission medium covers a system path length between the transmitter 20 and the receiver 24. In most systems of interest, such as transoceanic or transcontinental systems, the system path length is at least several thousand kilometers. Such long distance soliton transmission media are generally realized by a plurality of lengths of optical fiber 21 which are desirably single mode optical fibers having the appropriate group velocity dispersion for supporting soliton propagation at frequency $\Omega$ and at those frequencies caused by the action of the sliding-frequency guiding filters 23-1–23-N. A dispersion D of 0.5 picoseconds per nanometer per kilometer is appropriate, for example. Silica-based optical fibers are suitable for this application. Fibers employing different materials as well as different properties such as polarization preservation are contemplated for use herein.

The sliding frequency filters 23-1–23-N for use in the present invention preferably have a parabolic shaped filter response near the peak of its nominal center frequency. Suitable filters 23-1–23-N may be realized from Fabry-Perot etalons, fiber Fabry-Perot etalons and the like. Aside from a parabolically shaped response peak, etalons exhibit many desirable characteristics such as tunability, and a periodic comb characteristic which lends to their attractiveness for wavelength-division-multiplexing applications.

The strength of a parabolically shaped peak filter response is a function of the curvature of the peak. The greater the curvature, the greater the strength. The curvature per unit soliton length of a parabolically shaped filter response around the peak of its nominal center frequency is referred to as the filter strength $\eta$, where all quantities are in soliton units.

Fiber Fabry-Perot etalon filters are disclosed in U.S. Pat. No. 4,861,136, U.S. Pat. No. 4,830,451 and U.S. Pat. No. 5,037,180, which are incorporated by reference herein. A multiport optical filter utilizing a Fabry-Perot etalon for wavelength selectivity is described in U.S. Pat. No. 5,050,954. While filters may not have a response curve which lends itself easily to defining a center frequency because of a lack of 3 dB points on the curve, the nominal center frequency of a filter is understood to be the frequency lying between the 3 dB points on a frequency response curve raised to an arbitrary power greater than unity which allows such 3 dB points to appear.

Other exemplary wavelength-tunable optical filters are described by H. Kobrinskie et al. in *IEEE Communications Magazine*, pp. 53–63 (October 1989), also incorporated by reference herein.

As shown in U.S. Pat. No. 5,357,364, the mean rate of change of nominal center frequency detuning of the filters 23-1–23-N as a function of distance is less than a prescribed maximum in soliton units. If the maximum rate is exceeded, the soliton frequency can no longer follow the filters, leading eventually to the elimination of the soliton pulses. For a parabolically shaped filter peak response, the exemplary maximum mean rate was shown to be approximately $(2/27)^{1/2}\eta$.

As discussed above, for a given optical transmission system, there are maximum and minimum soliton energies which can be effectively transmitted. Achieving a sufficiently wide range of maximum to minimum soliton energy is crucial to creation of optical transmission systems with reasonable tolerances for transmission energies. The present invention discloses parameters of the filters, such as its filter strength $\eta$, which maximize the range of soliton energy which can be transmitted. As explained further below, it has been found that a filter strength $\eta$ of about 0.3–0.5 in soliton units provides a ratio of maximum to minimum soliton energy of greater than about 1.5 to 1. In accordance with the present invention, therefore, the sliding frequency filters 23-1–23-N in FIG. 1 have a filter strength $\eta$ of about 0.3–0.5 and preferably about 0.4, in soliton units. Preferably, the minimum mean rate of change of nominal center frequency &tuning as a function of distance, referred to hereinafter as the minimum sliding frequency rate $\omega'_f$, is approximately equal to $0.034\eta + 0.047\eta^2$ in soliton units.

The presently understood theoretical basis explaining the use of sliding-frequency guiding filters can be found in U.S. Pat. No. 5,357,364, incorporated by reference herein. Here, we only discuss and elaborate upon those aspects necessary to understand the present invention.

The propagation equation for solitons, including filter loss and compensating gain from the amplifying elements, is:

$$\frac{\partial u}{\partial z} = i\left[\frac{1}{2}\frac{\partial^2 u}{\partial t^2} + u*u^2\right]\frac{1}{2}\left[\alpha - \eta\left(i\frac{\partial}{\partial t} - \omega_f\right)^2\right]u$$

where $\alpha$ and $\eta$ are the excess gain and filter strength, respectively, per unit length and where $\omega_f$ is the nominal peak or center frequency of an optical filter per unit length. Since the center frequency of the filters $\omega_f$ shift with distance, we define a sliding rate $\omega'_f = d\omega_f/dz$. Although the quantities $\alpha$ and $\eta$ are characterized as continuously distributed quantities, they are easily converted into lumped, periodic equivalent quantities consistent with the use of lumped periodic amplifying and filtering elements 12 of FIG. 1, as shown in U.S. Pat. No. 5,357,364.

In theoretical work, unless otherwise indicated, instead of the real units of meters, seconds, Gigahertz, etc, it is possible to use the special soliton units $z_c$, $t_c$, and $\omega_c$, respectively. The soliton unit length, $z_c$, is a characteristic length for dispersive effects, and is given by:

$$z_c = 0.322 \frac{2\pi c}{\lambda^2} \frac{\tau^2}{D}$$

where c is the vacuum speed of light, $\lambda$ the wavelength of the soliton pulse, $\tau$ the full-width at half maximum (FWHM) of the soliton in time, and D is the optical fiber group delay parameter or dispersion represented in units of time/unit wavelength-shift/unit length. Within the context of ultra long distance soliton transmission, $z_c$ is typically at least many hundreds of kilometers long. The soliton unit time, $t_c$, is:

$$t_c = \frac{\tau}{2\cosh^{-1}\sqrt{2}} = \frac{\tau}{1.762747\ldots}$$

where $\tau$ is the full width at half maximum of the soliton pulse. Finally, the soliton unit frequency, $\omega_c$, is one radian per $t_c$.

The frequencies $\omega$, in soliton units, are converted to practical frequencies, as:

$$f(GHz) = \frac{\omega}{2\pi t_c} \times 10^{-9} = (1.7627\ldots) \times \frac{\omega}{2\pi\tau} \times 10^{-9}$$

To study the effect of the filter strength $\omega$ on the operation of a soliton transmission system, we first converted filter strength in real units to soliton units. In soliton units, filter strength $\eta$ is:

$$\eta = \eta_f \left(\frac{1}{2\pi t_c}\right)^2 \frac{z_c}{L_f}$$

where $\eta_f$ refers to a single filter in real units, and where $L_f$ is the filter spacing. For a Fabry-Perot etalon with mirror reflectivity R and spacing d, and a Free Spectral Range ("FSR") $\Delta f = c/(2d)$, $$\eta_f = \frac{R}{(1-R)^2} \frac{4\pi^2}{(\Delta f)^2}$$

Combining the above equations and substituting $z_c = 2\pi c t_c^2 / \lambda^2 D$, yields:

$$\eta = \frac{8\pi R}{(1-R)^2} \left(\frac{d}{\lambda}\right)^2 \frac{1}{cDL_f}$$

Expressing d in mm, $\lambda$ in $\mu$m, D in ps/nm-km, and $L_f$ in km, the preceding equation can be simplified to:

$$\eta = 83.77 \frac{R}{(1-R)^2} \left( \frac{d}{\lambda} \right) \frac{1}{DL_f}$$

In accordance with the above equation, for a given filter, the filter strength $\eta$ in soliton traits depends on the dispersion D of the optical fiber, the wavelength $\lambda$ of the soliton pulse and the distance $L_f$ between the filters. The filter strength $\eta$ is independent of the soliton pulse width $\tau$. The effect of changing the filter strength $\eta$ on the transmission of solitons can therefore be conveniently analyzed by varying the dispersion D, which can in turn for a given fiber be varied by varying the wavelength $\lambda$ of the soliton pulse, or by changing the filter spacing.

The sliding filter frequency rate $\omega'_f$ can be similarly calculated from real quantities in accordance with the following equation:

$$\omega'_f = 4\lambda^2 f' c t_c^3 / \lambda^2 D$$

The excess gain $\alpha$ can also be similarly calculated from real quantities in accordance with the following equation:

$$\alpha = \alpha_R t_c^2 2\pi c/\lambda^2 D$$

In the above two equations, f' and $\alpha_R$ are equal to $\omega'_f/2\pi$ and $\alpha$ respectively, expressed in real units.

The filter strength $\eta$, and excess gain $\alpha$ in soliton units are dependent on each other while the sliding frequency rate $\omega'_f$ in soliton units is independent of both the filter strength $\eta$ and excess gain $\alpha$.

The effects of varying the filter strength $\eta$ and sliding frequency rate $\omega'_f$ were analyzed experimentally with the recirculating loop and filters described in Mollenauer, et al., Optics Letters 19, 704 (1994), incorporated by reference herein. Three optical fiber spans, each about 26 km long, were used. The wavelength of zero dispersion $\lambda_0$ was 1550.5 nm. The dispersion slope of the optical fiber was 0.07ps/ (nm$^2$km). One erbium fiber amplifier and an etalon were connected between each of the fiber spans. Each etalon had a 1.5 mm air gap between mirrors, (FSR=100 Ghz), and had a reflectivity R of 9%. To provide the sliding filter frequency effect, the etalons were piezo-scanned in synchronization with the repeated transmission to adjust the air gap, changing the nominal center frequency of the filter. Suitable etalons can be obtained from JDS Fitel, Inc. of Ontario, Canada, for example. The sliding rate was varied over the range of 0–15 GHz/Mm, and $\eta$(D) was varied by tuning the wavelength of the input soliton pulses over the region 1552–1561 nm. The filter strength $\eta$ was also varied by reducing the number of etalons in the loop from three to two (thereby increasing the mean value of $L_f$ from 26 km to 39 kin). Both the excess gain and the soliton pulse energy were determined by the adjustable pump level of the erbium fiber amplifiers.

Figure 3:
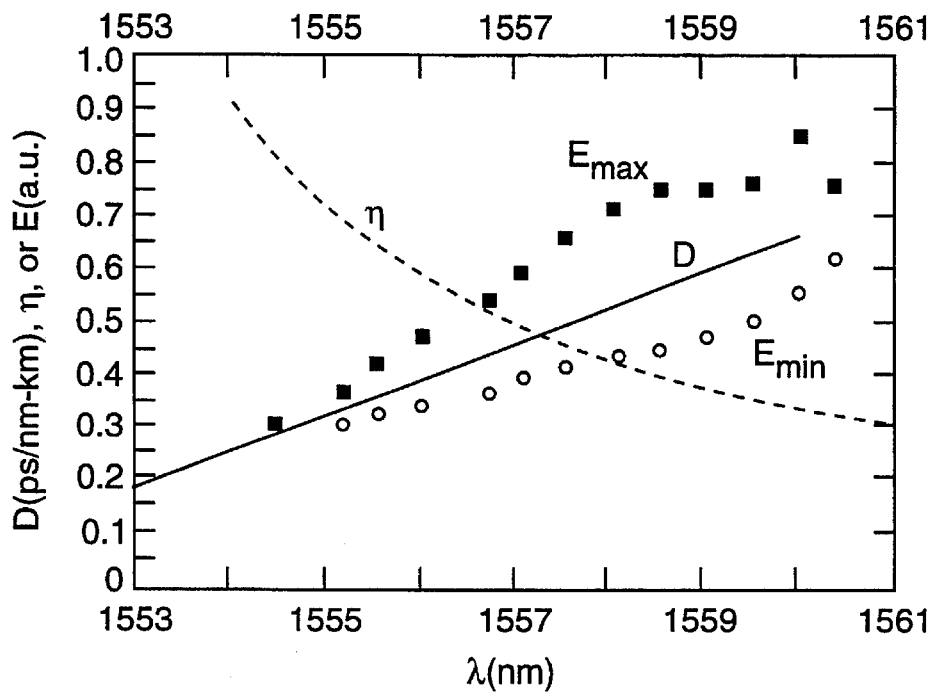
FIG. 3 is a graph of dispersion D, filter strength $\eta$ and soliton energy E, versus wavelength $\lambda$ of a soliton pulse, such as the exemplary soliton pulse of FIG. 2.

As discussed above, in designing an optical transmission system, a wide range of stable soliton transmission energy is desirable. FIG. 3 is a graph of the maximum soliton energy Emax and the minimum soliton energy Emin, which can be transmitted without significant error over 10 Mm using in the experimental set up described above, at a sliding frequency rate of +13 GHz/Mm. The "+" indicates that the frequency was increasing in the direction of transmission. Significant error in these experiments is considered to be less than one error in $10^{10}$ bits over 10 Mm, at a bit rate of 10 Gbits/second. This is a more stringent error rate than the industry standard of less than one error in $10^9$ bits. Since we are examining the ratio of Emax to Emin, not their absolute values, the energy E of the y-axis is in terms of arbitrary units (a.u.). Also shown on the graph of FIG. 3 are the values of the dispersion D in picoseconds per nanometers per kilometer for the optical fiber described above, and the calculated values of filter strength $\eta$, at these wavelengths. The filter strength $\eta$ is inversely proportional to the dispersion D of the fiber.

The experimental results graphed on FIG. 3 show that the largest ratio of Emax to Emin, almost 2 to 1, is provided at that wavelength, 1558 nanometers in the present example, where the filter strength $\eta$ in soliton units is about 0.4. That a filter strength $\eta$ in soliton units of 0.4 is a preferred filter strength because it provides the largest ratio of Emax to Emin, is one of the teachings of the present invention. While the wavelength $\lambda$ will vary with different optical fibers with different dispersion slopes, the value of $\eta$ in soliton units giving the largest ratio of Emax to Emin will remain the same.

FIG. 3 also demonstrates that for those wavelengths (here less than 1554 nm) where filter strength $\eta$ is about 0.8 and above, there is no range of energy which provides error free propagation.

In similar experiments with different loop configurations (three 100 GHz FSR etalons in the 78 km loop, three 100 GHz FSR etalons in a 100 km loop, and two 75 GHz FSR etalons in a 100 km loop), we observed essentially the same dependence of the ratio of Emax to Emin on the filter strength $\eta$.

Figure 4:
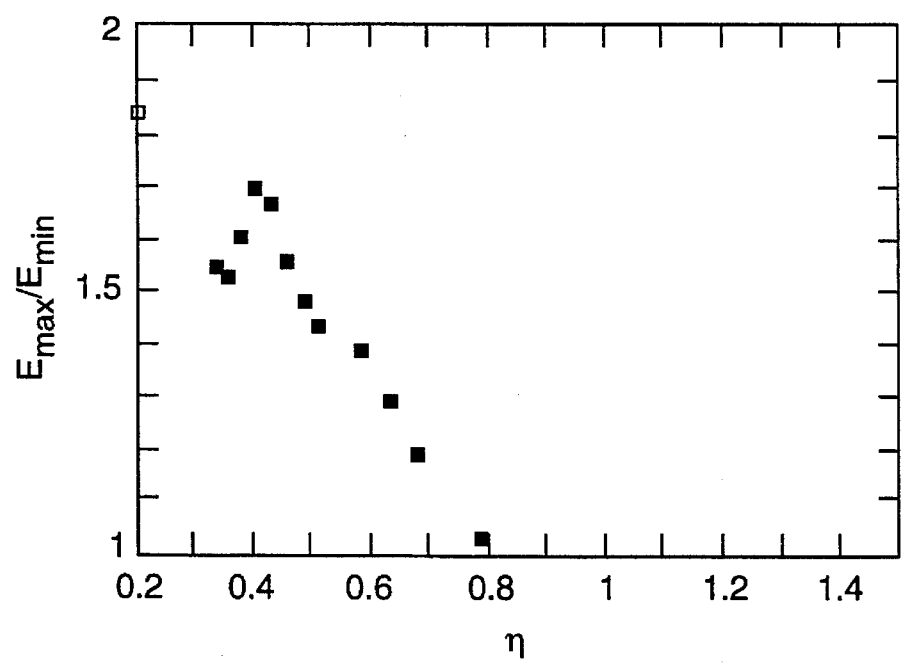
FIG. 4 is a graph of the ratio of Emax to Emin, versus filter strength.

FIG. 4 is a comparison of the ratio of Emax to Emin (y-axis) versus filter strength $\eta$ (x-axis), based on the experiments discussed above. FIG. 4 more clearly shows that a filter strength $\eta$ of about 0.4 gives the maximum ratio of about 1.7, as shown in FIG. 3. Both increasing and decreasing the filter strength causes rapid decreases in the ratio. Lower filter strengths are less able to sufficiently reduce jitter for error free transmission. Higher filter strengths promote non-soliton components which cannot be removed by the sliding frequency configuration. Such non-soliton components start to manifest themselves as tails, as in FIGS. 7 and 10, and described further below. While a soliton can remain stable with a small tail, larger tails can interfere with subsequent soliton pulses, at the 10 GBit/sec transmission rate of the experiments. Increasing nonosoliton components can evolve into additional solitons, as in FIG. 8, destroying any ability to transmit information. As the filter strength $\eta$ approaches 0.8, there is essentially no difference between Emax and Emin, and no energy range of stable soliton transmission of these transmission rates. In accordance with the present invention, therefore, an optical transmission system for solitons with sliding frequency filters would most preferably have a filter strength of about 0.4. A ratio of greater than about 1.5 is sufficient to make a powerful, practical system and from FIG. 4, we have determined that a range of filter strength $\eta$ of between about 0.3–0.5 is preferred.

Figure 5:
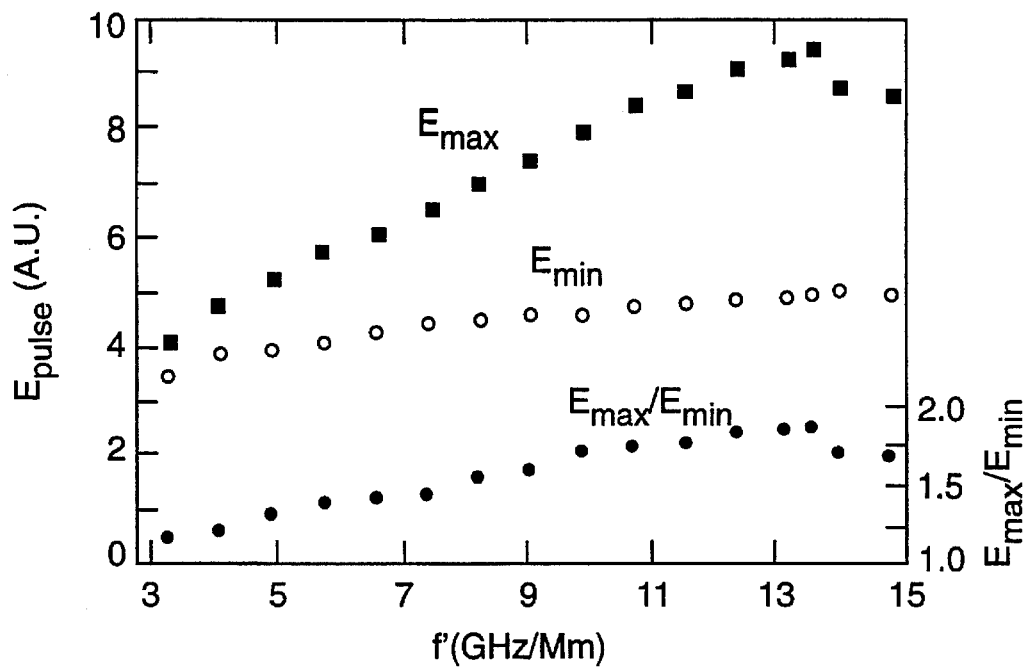
FIG. 5 is a graph of soliton energy E versus sliding frequency rate f in MHz/Mm.

The ratio of Emax to Emin is also dependent on the sliding frequency rate. FIG. 5 compares Emax, Emin, and the ratio of Emax to Emin, to increasing sliding frequency filter rate, at a fixed filter strength $\eta$ of 0.4, in the experimental set up above. As in FIG. 3, the energy E of the soliton pulse is expressed in arbitrary units (a.u.) on the left side of the y-axis. The ratio of Emax to Emin is expressed on the right side of the y-axis. The sliding filter frequency rate is expressed in GHz/Mm on the x-axis. These experiments showed that a maximum ratio of about 1.7 to 1 is obtained at a sliding frequency rate of about +13 GHz/Mm at a filter strength η of 0.4. The ratio decreases for sliding filter frequency rates both greater than and less than +13 GHz/Mm. At the conditions of the experiment, a ratio of greater than about 1.5 to 1 is achievable at sliding frequencies of between about 7–15 GHz/Mm.

Figure 6:
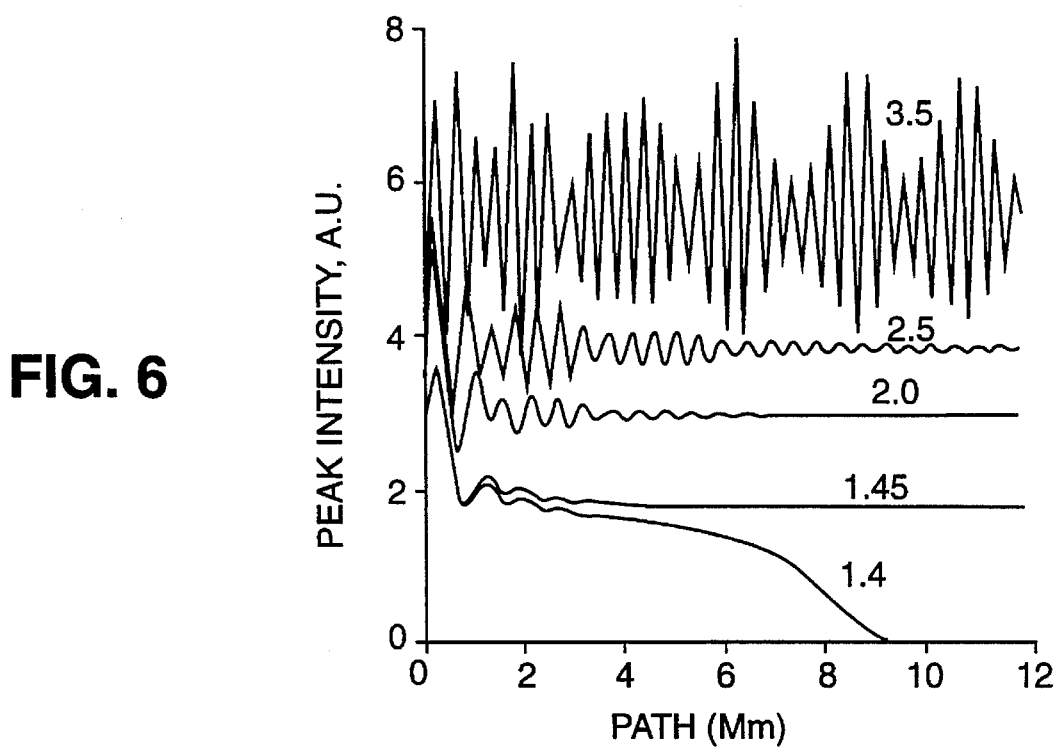
FIG. 6 is a graph of peak intensity versus path length for various amplifier excess gains.
Figure 7:
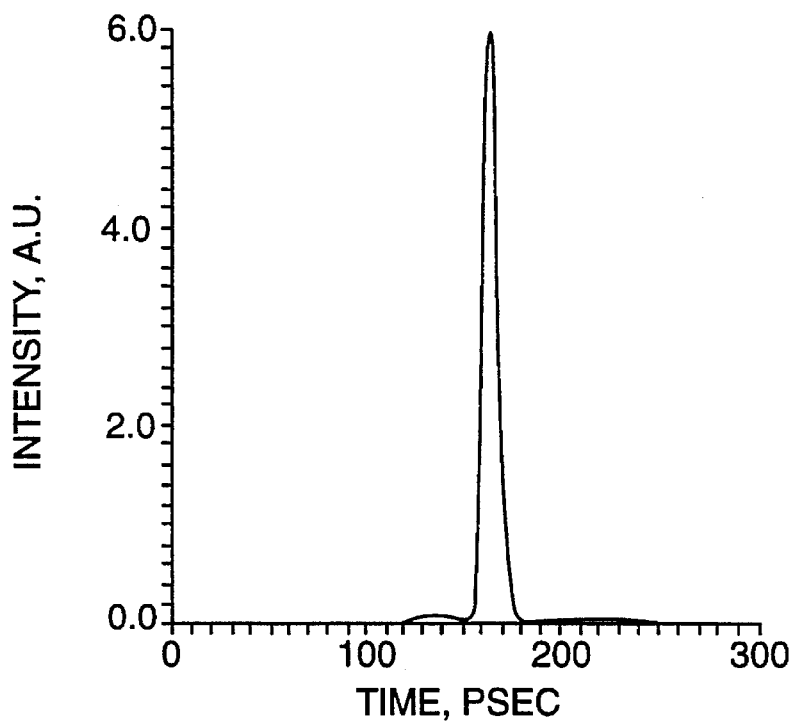
FIG. 7 is an example of a soliton pulse with a tail.
Figure 8:
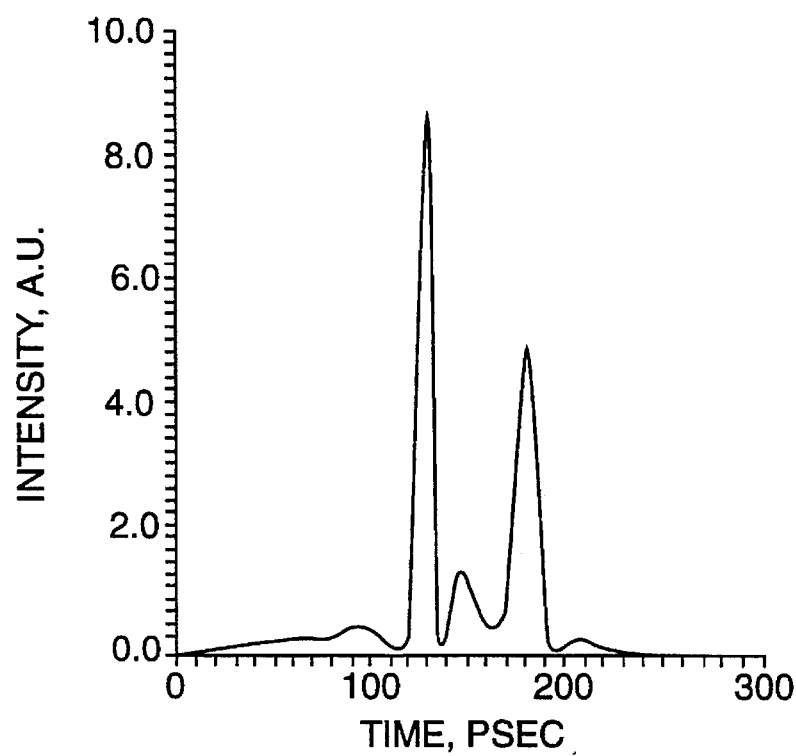
FIG. 8 is an example of the generation of multiple solitons due to instability.

Excess amplifier gain is another parameter of interest in lightwave transmission systems supporting soliton propagations. The maximum and minimum allowable values of excess amplifier gain $\alpha_R$ in real units were numerically determined at a sliding frequency rate in real units of +13 GHz/Mm and a filter strength η of 0.4 in soliton units. FIG. 6 is a graph of the peak intensity in arbitrary units (a.u.) along the y-axis versus path length in million meters (Mm) along the x-axis, for gains $\alpha_R$ of 1.4, 1.45, 2.0, 2.5 and 3.5 $Mm^{-1}$. There is only a limited range of allowable excess gain $\alpha_R$ for stable soliton transmission with sliding frequency filters, dependent on the sliding frequency rate $\omega'_f$ and the filter strength η. At a sliding frequency rate in real units of +13 GHz/Mm, and a filter strength η of 0.4 in soliton units, at an excess gain $\alpha_R$ of 1.4 $Mm^{-1}$, the soliton pulse eventually dissipates. An excess gain $\alpha_R$ of 1.45 $Mm^{-1}$ will sustain a pulse. An excess gain $\alpha_R$ of 2.0 $Mm^{-1}$ is about optimum. Excess gains of 2.5 $Mm^{-1}$ and 3.5 $Mm^{-1}$ are acceptable. One can see non-decaying oscillations in the pulse intensity evolution at a gain $\alpha_R$ of 3.5 $Mm^{-1}$, however. These oscillations are due to the generation of dispersive wave radiation, a non-soliton component caused by the filtering and sliding themselves, which can lead to the formation of tails, as shown in FIG. 7. If the excess gain is further increased, this nonsoliton component can evolve into a second soliton, and with further propagation into yet more solitons, as shown in FIG. 8. This pulse breakup corresponds to the upper limit of excess gain $\alpha_R$ and therefore the upper limit of the pulse energy of the soliton, as discussed further below.

Figure 9:
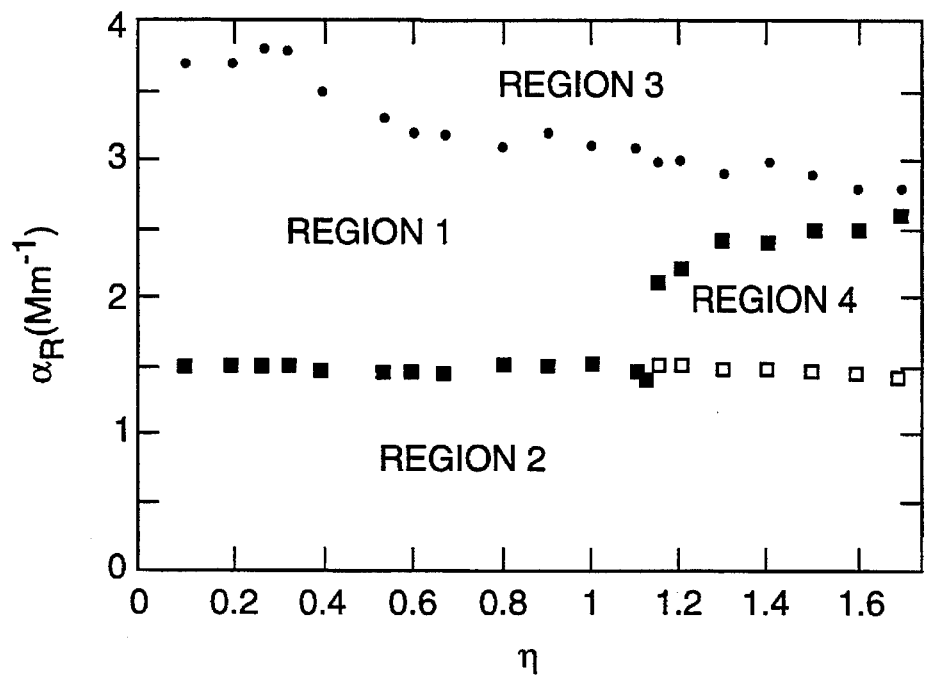
FIG. 9 is a graph of excess gain $\alpha_R$ versus filter strength $\eta$.
Figure 10:
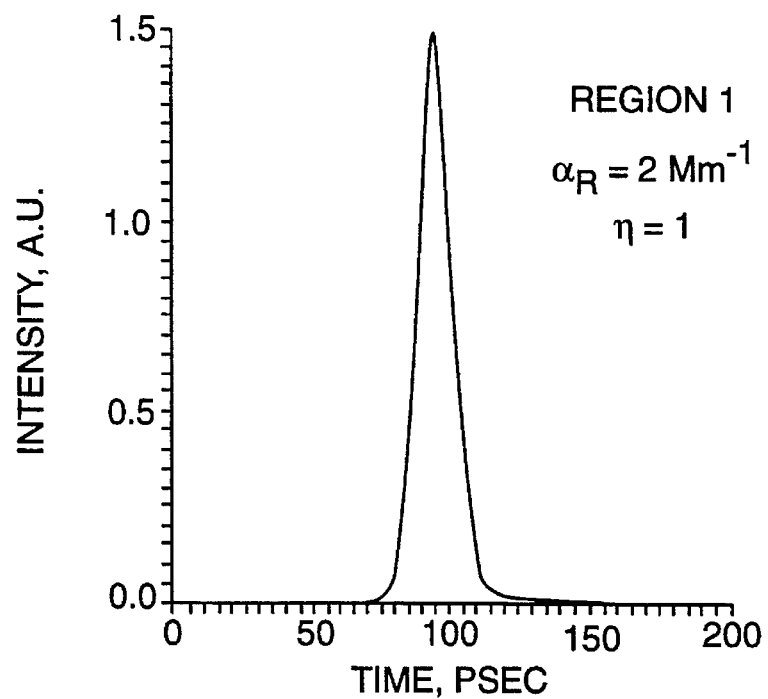
FIG. 10 is an example of a soliton in Region 1 of FIG. 9, at an excess gain $\alpha_R$ of 2 Mm$^{-1}$ and a filter strength $\eta$ of 1.0.

FIG. 9 is a graph of excess gain $\alpha_R$ in $Mm^{-1}$ versus filter strength η, based on our numerical simulations. Region 2 is an unstable region defined by an excess gain $\alpha_R$ of less than about 1.50 $Mm^{-1}$. Region 3 is another unstable region defined by excess gains $\alpha_R$ of 3– 3.5 $Mm^{-1}$, dependent on the filter strength η. While Region 1 allows for stable soliton propagation, there is significant variation of pulse and spectral shape with filter strength η. For η≦0.8, the pulse and spectral shapes are close to that of a soliton. For 0.8<η<1.1, the pulse and spectral shapes develop tails. FIG. 10 shows a soliton pulse with a tail, at an excess gain $\alpha_R$ of 2 $Mm^{-1}$ and a filter strength η of 1.0. Further increases in filter strength η, in Region 4, yield unstable propagation of the soliton pulse, with eventual generation of additional solitons, similar to that shown in FIG. 8. Quasi-stable propagation, at least up to distances of 200 soliton dispersion lengths, results from parameters on the border between Regions 2 and 4.

While the experimental results shown in FIGS. 3 and 4 suggest that a filter strength η of about 0.8 is about the maximum filter strength η for error free soliton transmission, FIG. 9 does show stable soliton transmission in Region 1 at filter strengths η greater than 0.8. The reason for this difference is that in the experiments, soliton pulses were transmitted at a rate of 10 GBits/sec. Tails, such as those shown in FIGS. 7 and 10, could therefore interfere with adjacent soliton pulses. FIG. 9, in contrast, was based on numerical simulations where only a single soliton was considered. Solitons pulses with small leading or trailing tails, without adjacent pulses to interfere with, could still be effectively transmitted. This suggests that if the transmission rate is sufficiently low, such as on the order of 2.5–5.0 GBits/sec, the soliton pulses could be sufficiently spaced so that the generation of small non-soliton components, and the resulting tails, would not interfere with transmission. Filter strengths η greater than 0.8 could then be used.

Figure 11:
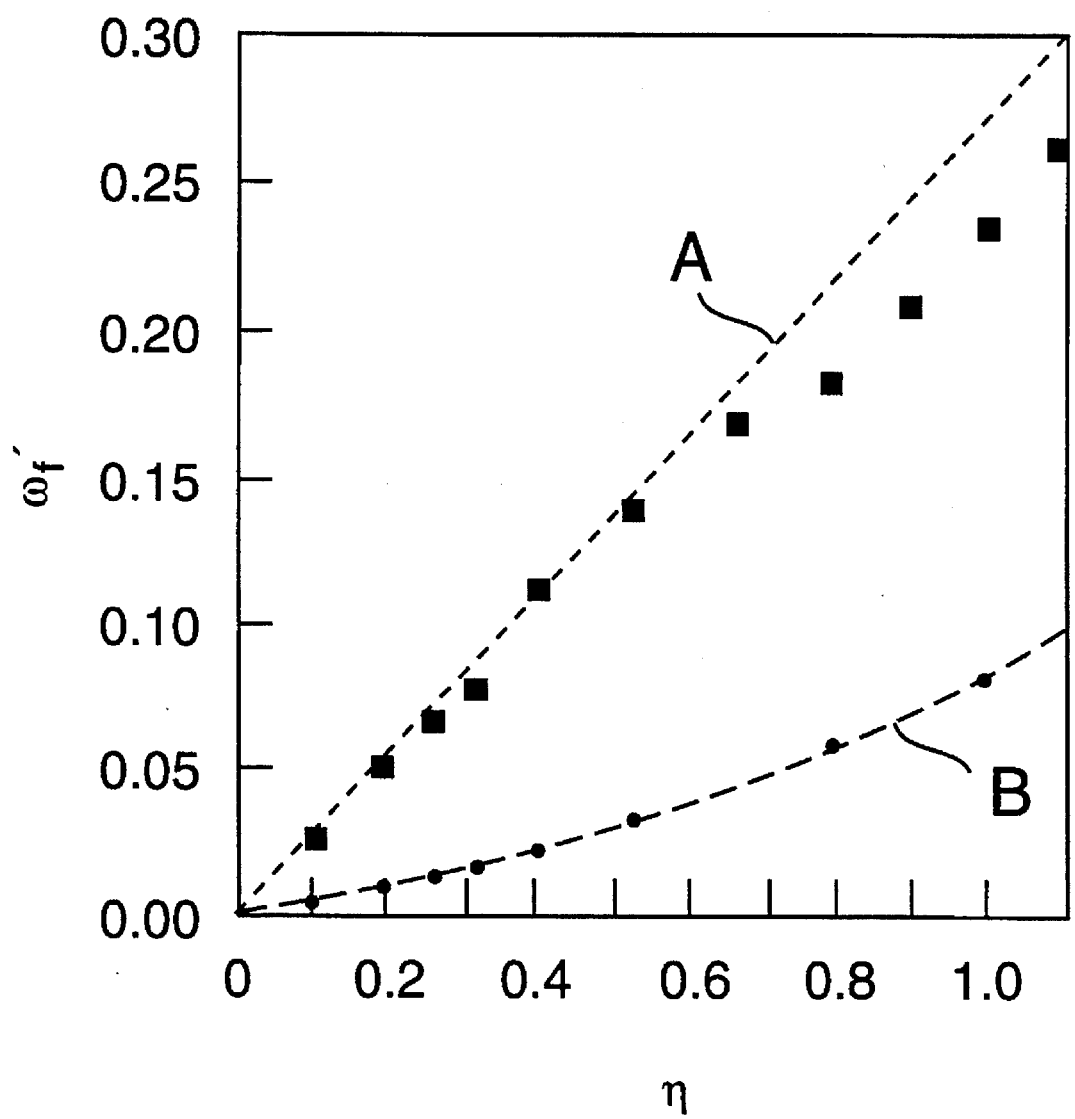
FIG. 11 is a graph of sliding filter frequency rate $\omega'_f$ in soliton units versus filter strength $\eta$.

The maximum and minimum sliding frequency rates for error free transmission as a function of filter strength was also numerically determined. In FIG. 11, the y-axis is the sliding frequency rate $\omega'_f$ in soliton units and the x-axis is filter strength η in soliton units. The dotted line A is the maximum sliding frequency rate of $(2/27)^{1/2}$η for error free transmission, which was derived in U.S. Pat. No. 5,357,364. The black boxes are numerically determined maximum frequency rates, which closely match the derived relationship.

As mentioned above, we have found that there is also a minimum mean sliding rate frequency rate for error free transmission. The black circles in FIG. 11 are the numerically determined minimum sliding frequency rates at filter strengths η of from 0.1–0.8. Curve B connecting the black circles can be approximately defined by the equation 0.034η+0.047η².

From FIG. 11, one can determine the acceptable range of sliding frequencies for a particular filter strength η between about 0.1–0.8. At the filter strength η found to give the maximum ratio of Emax to Emin in FIGS. 3 and 4, about 0.4, the sliding frequency rate can be between about 0.02–0.11 in soliton units. At the lower limit of the preferred range of filter strength, 0.3, the mean sliding frequency rate $\omega'_f$ can vary from about 0.01–0.08 in soliton units. At the upper limit of the preferred range of filter strength η, 0.5, the mean sliding frequency rate $\omega'_f$ can vary between about 0.03–0.14. At a filter strength η of about 0.8, the sliding frequency $\omega'_f$ can vary from about 0.06–0.22.

Since the sliding rate $\omega'_f$ and excess gain $\alpha_R$ depend on the pulse width τ in real units, the sliding filter frequency rate $\omega'_f$ in soliton units can be increased by increasing the pulse width. Since the soliton pulse energy E is inversely proportional to the pulsewidth τ, increasing the pulse width τ decreases the energy E of the pulse. The maximum sliding frequency rate $\omega'_f$ therefore corresponds to the minimum energy Emin which can be transmitted error free at that filter strength η, while the minimum sliding frequency rate corresponds to the maximum energy Emax, both of which are shown in FIG. 3. From the ratio $\omega'_{f,max}/\omega'_{f,min}$, the dependence of Emax/Emin on η shown in FIG. 10 can be calculated.

The limited range of allowable gain $\alpha_R$ and of soliton energy can be understood entirely in terms of the sliding frequency $\omega'_f$. As the gain $\alpha_R$ is lowered, the pulse width τ of the soliton increases until the sliding rate in soliton units $\omega'_f$ becomes too fast for the soliton to follow the sliding. This lower limit of gain $\alpha_R$ corresponds to the case when one of the soliton damping constants becomes negative and the maximum sliding frequency rate is $(2/27)^{1/2}$η. As $\alpha_R$ is increased above this lower limit, the soliton propagation becomes stable, and remains stable as long as non-soliton components generated by the perturbing effects of filtering and sliding are efficiently removed by the sliding. When $\alpha_R$ becomes too high, however, the soliton pulse width τ decreases, the soliton energy becomes too high, and $\omega'_f$ becomes too low to efficiently remove the non-soliton components, causing the instability discussed above. This effect determines the lower limit of the sliding frequency rate $\omega'_f$ and the upper limit of the soliton energy Emax for stable soliton propagation.

The present invention has been described in terms of increasing sliding filter frequencies in a single direction of propagation, which is preferred. If the frequencies of the sliding frequency filters were decreasing, however, approximately the same filter strengths η would be preferred, in accordance with the present invention. The closer the frequency response curve of the filter is to that of an ideal Gaussian, the closer the preferred filter strengths η would be for sliding frequency filters with frequencies decreasing in the direction of transmission, to the preferred filter strengths η for increasing frequencies. Similarly, a bidirectional transmission system can be made in accordance with the present invention with the same filter strengths. Because increasing sliding filter frequencies provide somewhat better transmission, however, in a bidirectional system, transmission would be somewhat better in the direction of increasing frequencies, than it would in the direction of decreasing frequencies.

What is claimed is:

1. A lightwave transmission system supporting soliton propagation in a particular band of frequencies comprising, an optical fiber transmission medium comprising a plurality of optical amplifiers spaced apart along the optical fiber transmission medium and a plurality of optical filters spaced apart along the optical fiber transmission medium, wherein each optical filter exhibits a nominal center frequency substantially different from the nominal center frequency of each other optical filter to move the frequency of the soliton toward its nominal center frequency, each nominal center frequency being in the particular band of frequency, and the optical filters have a filter strength η of between about 0.3–0.5 in soliton units.

2. The lightwave transmission system of claim 1, wherein the optical filters have a filter strength η of about 0.4.

3. The lightwave transmission system of claim 2, wherein the center frequencies of the plurality of optical filters changes at a mean rate in soliton units of greater than or equal to approximately $0.034\eta + 0.047\eta^2$.

4. The lightwave transmission system of claim 2, wherein, over at least a portion of the transmission system, the center frequencies of the plurality of optical filters changes at a mean rate in soliton units of less than or equal to approximately $(2/27)^{1/2}\eta$.

5. The lightwave transmission system of claim 4, wherein the center frequencies of the plurality of optical filters changes at a mean rate in soliton units of greater than or equal to approximately $0.034\eta + 0.047\eta^2$.

6. The lightwave transmission system of claim 1, wherein, over at least a portion of the transmission system, the center frequencies of the plurality of optical filters changes at a mean rate in soliton units of less than or equal to approximately $(2/27)^{1/2}\eta$.

7. The lightwave transmission system of claim 6, wherein the center frequencies of the plurality of optical filters changes at a mean rate in soliton units of greater than or equal to approximately $0.034\eta + 0.047\eta^2$.

8. The lightwave transmission system of claim 1, wherein the center frequencies of the plurality of optical filters changes at a mean rate in soliton units of greater than or equal to approximately $0.034\eta + 0.047\eta^2$.

9. A lightwave transmission system supporting soliton propagation in a particular band of frequencies comprising, an optical fiber transmission medium comprising a plurality of optical amplifiers spaced apart along the optical fiber transmission medium and a plurality of optical fibers spaced apart along the optical fiber transmission medium, wherein each optical filter exhibits a nominal center frequency substantially different from the nominal center frequency of each other optical filter to move the frequency of the soliton toward its nominal center frequency, each nominal center frequency being in the particular band of frequency and increasing in the direction of propagation, wherein the optical filters have a filter strength η of between about 0.3–0.5 in soliton units.

10. A method for soliton propagation in a lightwave transmission system comprising, amplifying solitons at a plurality of locations along the system; and filtering the solitons at a plurality of locations along the system to translate the solitons to a second frequency different from a soliton launch frequency by filters having a filter strength of about 0.3–0.5.

11. The method of claim 10, wherein the filters have a filter strength of about 0.4.

12. The method of claim 11, wherein the filtering occurs at different nominal center frequencies along at least a portion of the length of the system so that the mean rate of change of frequency in soliton units is less than or equal to approximately $(2/27)^{1/2}\eta$.

13. The method of claim 12, wherein the filtering occurs at different nominal frequencies along at least a portion of the length of the system so that the mean rate of change of frequency in soliton units is greater than or equal to approximately $0.034\eta + 0.047\eta^2$.

14. The method of claim 11, wherein the frequency of the soliton is translated to higher frequencies.

15. The method of claim 11, wherein the filtering occurs at different nominal center frequencies along at least a portion of the length of the system so that the mean rate of change of frequency in soliton units is greater than or equal to approximately $0.034\eta + 0.047\eta^2$.

16. The method of claim 10, wherein the filtering occurs at different nominal center frequencies along at least a portion of the length of the system so that the mean rate of change of frequency in soliton units is less than or equal to approximately $(2/27)^{1/2}\eta$.

17. The method of claim 16, wherein the filtering occurs at different nominal frequencies along at least a portion of the length of the system so that the mean rate of change of frequency in soliton units is greater than or equal to approximately $0.034\eta + 0.047\eta^2$.

18. The method of claim 10, wherein the filtering occurs at different nominal center frequencies along at least a portion of the length of the system so that the mean rate of change of frequency in soliton units is greater than or equal to approximately $0.034\eta + 0.047\eta^2$.

* * * * *